May 23, 1961 R. A. CAMPBELL 2,985,715
GATING SYSTEM
Filed Oct. 4, 1956 3 Sheets-Sheet 2
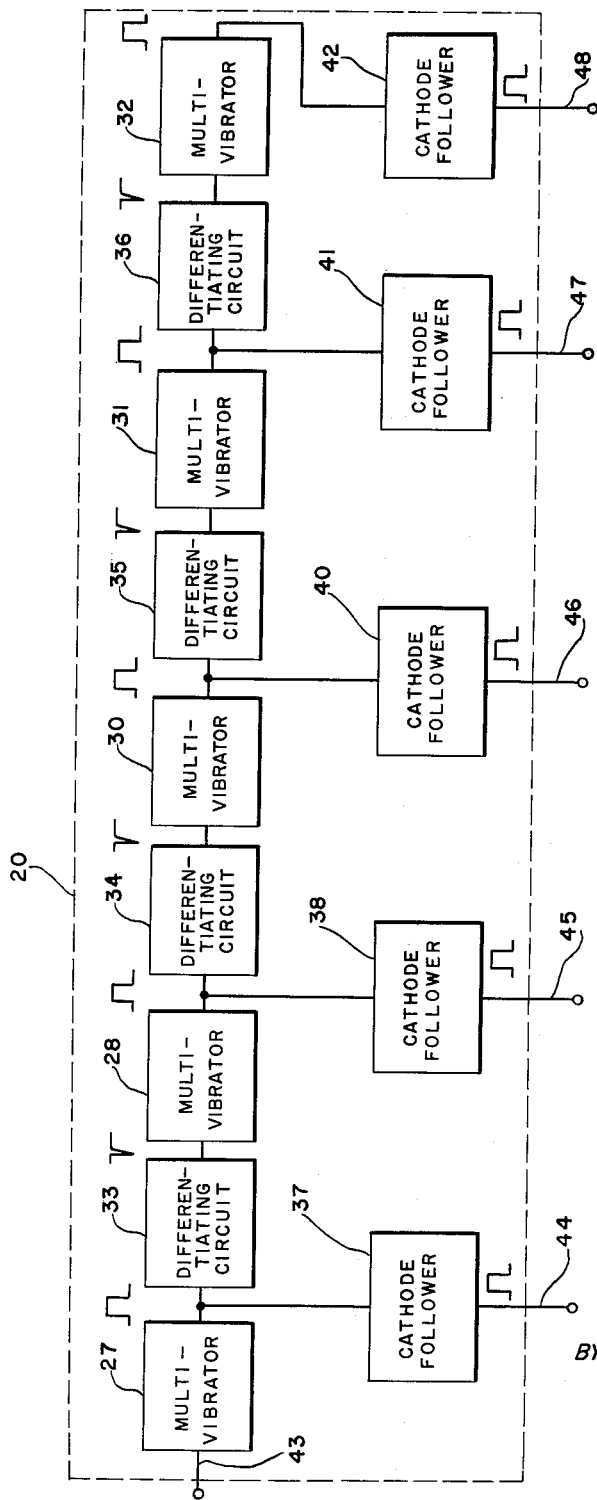
FIG. 2.
INVENTOR.
Richard A. Campbell,
BY 
ATTORNEY.

May 23, 1961 R. A. CAMPBELL 2,985,715
GATING SYSTEM
Filed Oct. 4, 1956 3 Sheets-Sheet 3

INVENTOR.
Richard A. Campbell,
BY
ATTORNEY.

United States Patent Office 2,985,715
Patented May 23, 1961

2,985,715
GATING SYSTEM
Richard A. Campbell, Los Angeles, Calif., assignor to Hughes Aircraft Company, Culver City, Calif., a corporation of Delaware
Filed Oct. 4, 1956, Ser. No. 614,781
7 Claims. (Cl. 178—43.5)

The present invention relates to electronic gating devices in general and more particularly to a gating system that rejects noise by passing received coded pulse trains only when, in accordance with a predetermined function of time, information pulses are expected to occur.

It is well known to those skilled in the communications field that transmitted signals are usually contaminated with noise by the time the signals are received. Noise is particularly bothersome in the case where the received signals are in pulse coded form because, in that case, the noise may prevent a clear and accurate discernment of the transmitted pulses. Moreover, some of the noise, such as spurious pulses, may be of such magnitude and in such a time relationship to the transmitted pulses as to cause an erroneous interpretation of the received signals. It is desirable, therefore, to employ some means at the receiver end that will permit only the transmitted pulses to get through, noise signals occurring between transmitted pulses being rejected. The gating system of the present invention is a means for obtaining such a result.

According to the basic concept of the present invention, the gating system is responsive to received trains of pulses in accordance with a prescribed time schedule or function of time that is correlated to the basic pulse repetition period of the pulses. More particularly, according to an embodiment of the present invention, the received trains of pulses are superimposed, that is, they are delayed by an appropriate number of delay line sections to bring them into time coincidence. Following this, the superimposed pulses are applied to an adder circuit which effectively integrates the pulses in such a manner that a train of reliable synchronizing pulses are produced. The synchronizing pulses are then used to trigger a waveform generator which generates as many trains of pulses as were received by the system, the pulses of the locally generated trains of pulses having the same time positions and durations as the pulses of the received trains of pulses. These locally generated trains of pulses gate "on" a plurality of gating circuits which are normally gated "off" and to which all received signals are applied, thereby permitting the desired information pulses to get through and rejecting noise in the intervals when pulses are not experted to occur.

It is, therefore, an object of the present invention to provide a gating system for rejecting noise signals that may confuse received trains of pulses representing intelligence.

It is another object of the present invention to provide a gating system that is responsive to a plurality of trains of pulses in accordance with a predetermined function of time correlated to the basic pulse repetition period of the pulses.

It is a further object of the present invention to provide a gating system that rejects noise in intervals between certain desired information pulses by passing received coded pulse trains only when, in accordance with a predetermined function of time, information pulses are expected to occur.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Fig. 2 is a block diagram of the gating waveform generator in the gating system of Fig. 1.

Figure 1:
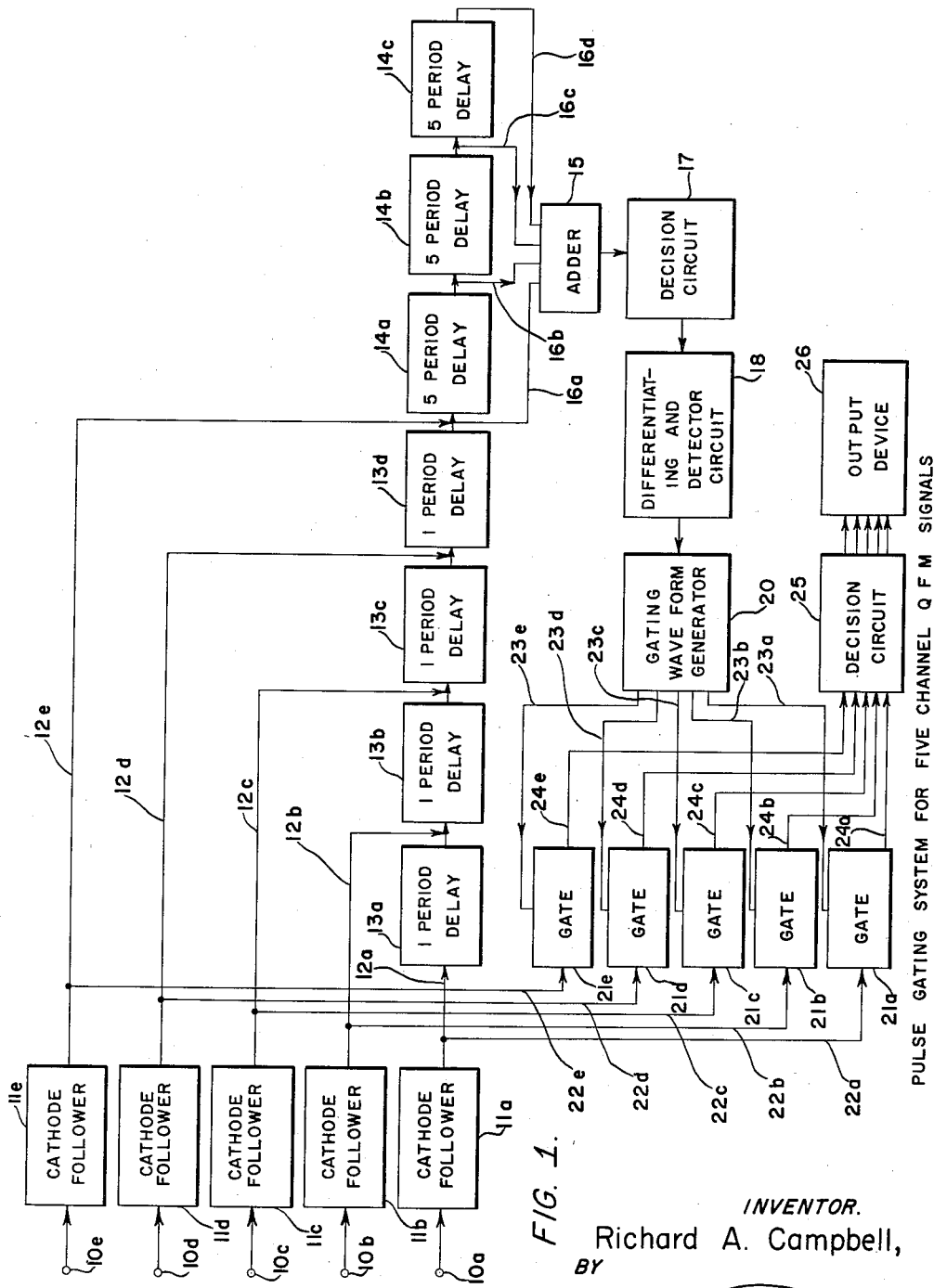
Fig. 1 is a block diagram of an embodiment of the gating system of the present invention.

Referring now to the drawings, there is shown in Fig. 1 a gating system for passing a plurality of coded pulse trains only when, in accordance with a predetermined function of time, information pulses are expected to occur. The gating system shown in Fig. 1 is responsive to only five trains of pulses. However, such an adaptation is presented here only for purposes of clarity. Actually, the gating system of the present invention may, by slight modifications thereof, be made responsive to any number of pulse trains as will be apparent to those skilled in the art following its description.

Accordingly, as shown in Fig. 1, the gating system comprises five input terminals $10a$–$10e$ electrically connected to five standard cathode follower circuits $11a$–$11e$, respectively, which may be referred to as five individual channels, the five output terminals of the cathode follower circuits being electrically connected by means of five electrical leads $12a$–$12e$ to an alignment circuit, which may also be called pulse delaying means or pulse combining means, comprising a first set of four delay line sections $13a$–$13d$ electrically connected in tandem. More particularly, the output terminal of cathode follower circuit $11a$ is connected by means of electrical lead $12a$ to the input end of delay line section $13a$, the output terminal of cathode follower circuit $11b$ is connected by means of electrical lead $12b$ to the input end of delay line section $13b$, the output terminal of cathode follower circuit $11c$ is connected by means of electrical lead $12c$ to the input end of delay line section $13c$, the output terminal of cathode follower circuit $11d$ is connected by means of electrical lead $12d$ to the input end of delay line section $13d$, and the output terminal of cathode follower circuit $11e$ is connected by means of electrical lead $12e$ to the output end of delay line section $13d$.

In the present case, the time delays of delay line sections $13a$–$13d$ are identical, each time delay being equal to the duration of a pulse of the received pulse trains, all the pulses of the received pulse trains having the same duration. However, in the broadest sense, the time delay of any one of delay line sections $13a$–$13d$ is equal to the time interval between the leading edge of a pulse in the train of pulses applied directly to that delay line section and the leading edge of a corresponding pulse in the train of pulses applied directly to the next following delay line section. Thus, in general, the time delay of delay line section $13b$ is equal to the lag time between the trains of pulses directly applied to delay line sections $13b$ and $13c$. An example of a delay line section that may be used is shown in Fig. 22.16 on page 746, vol. 19 of the MIT Radiation Laboratory Series, published in 1949 by the McGraw-Hill Book Company, Inc.

The output end of delay line section $13d$ is electrically connected to a second set of three delay line sections 14a–14c electrically connected in tandem as shown in the figure, the time delays of delay line sections 14a–14c also being identical. In this case, however, the time delay for each section is equal to five times the duration of a pulse of the received pulse trains. The reason for such a delay for each of delay line sections 14a–14c will be more clearly understood later. Delay line sections 14a–14c may be of the same type referred to above.

An adder circuit 15 having four input terminals is electrically connected by means of four electrical leads 16a–16d to the input and output ends of delay line sections 14a–14c. More specifically, the first input terminal of adder circuit 15 is connected by means of electrical lead 16a to the input end of delay line section 14a, the second input terminal of adder circuit 15 is connected by means of electrical lead 16b to the input end of delay line section 14b, the third input terminal of adder circuit 15 is connected by means of electrical lead 16c to the input end of delay line section 14c, and the fourth input terminal of adder circuit 15 is connected by means of electrical lead 16d to the output end of delay line section 14c. Adder circuit 15 may be any conventional circuit for producing at its output terminal a signal representing the sums of the signals applied to its four input terminals. In its simplest forms, adder circuit 15 comprises four resistors electrically connected between its four input terminals, respectively, and its output terminal.

A decision or amplitude responsive circuit 17 is electrically connected between adder circuit 15 and a differentiating and detecting circuit 18, the output terminal of differentiating and detector circuit 18 being electrically connected to a gating waveform generator 20 having five output terminals.

Decision circuit 17 is the type of circuit that produces an output pulse only when the signal applied thereto exceeds a predetermined voltage level and may be any one of a number of threshold devices, such as a flip-flop circuit suitably biased to trigger only when a predetermined voltage level is attained at its input end. A flip-flop circuit particularly well suited as a decision circuit in the present gating system is the Schmitt trigger circuit. A circuit diagram and description of a Schmitt trigger circuit is shown on pages 57 through 59 of "Time Bases" by O. S. Puckle, published in 1943 by John Wiley and Sons, Inc., New York.

The differentiating portion of differentiating and detector circuit 18 may be simply a capacitor and resistor connected in series between the output terminal of decision circuit 17 and ground, the time constant of the resistor-capacitor being relatively short so as to provide the desired differentiation of the signals applied thereto. The detector portion of circuit 18 may simply be a diode appropriately connected in parallel with the resistor of the differentiating portion of the circuit.

Gating waveform generator 20 may be a combination of multivibrators, differentiating circuits and cathode follower circuits combined in such a manner as to successively produce five output pulses for each pulse applied thereto by differentiating and detector circuit 18. The five output pulses are produced at the five output terminals, respectively, of the gating waveform generator and are of the same duration as the pulses of the received pulse trains. A particular gating waveform generator circuit will be described more fully below.

The gating system of the present invention also includes five gating circuits 21a–21e, each such gating circuit having first and second input terminals and a single output terminal. Thus, gating circuits 21a–21e have five first input terminals, five second input terminals, and five output terminals. The five first input terminals of gating circuits 21a–21e are electrically connected by means of five electrical leads 22a–22e to the five output terminals of cathode follower circuits 11a–11e, respectively, and the five second input terminals of gating circuits 21a–21e are electrically connected by means of five electrical leads 23a–23e to the five output terminals of gating waveform generator 20, respectively. The five output terminals of gating circuits 21a–21e, on the other hand, are electrically connected by means of five electrical leads 24a–24e to the five input terminals of a decision circuit 25 which also has five output terminals.

More particularly, the first input terminal of gating circuit 21a is connected by means of electrical lead 22a to the output terminal of cathode follower circuit 11a, the first input terminal of gating circuit 21b is connected by means of electrical lead 22b to the output terminal of cahode follower circuit 11b, the first input terminal of gating circuit 21c is connected by means of electrical lead 22c to the output terminal of cathode follower circuit 11c, the first input terminal of gating circuit 21d is connected by means of electrical lead 22d to the output terminal of cathode follower circuit 11d, and the first input terminal of gating circuit 21e is connected by means of electrical lead 22e to the output terminal of cathode follower circuit 11e.

Similarly, the second input terminal of gating circuit 21a is connected by means of electrical lead 23a to the first output terminal of gating waveform generator 20, the second input terminal of gating circuit 21b is connected by means of electrical lead 23b to the second output terminal of gating waveform generator 20, the second input terminal of gating circuit 21c is connected by means of electrical lead 23c to the third output terminal of gating waveform generator 20, the second input terminal of gating circuit 21d is connected by means of electrical lead 23d to the fourth output terminal of gating waveform generator 20, and the second input terminal of gating circuit 21e is connected by means of electrical lead 23e to the fifth output terminal of gating waveform generator 20.

Finally, the output terminal of gating circuit 21a is connected by means of electrical lead 24a to the first input terminal of decision circuit 25, the output terminal of gating circuit 21d is connected by means of electrical lead 24b to the second input terminal of decision circuit 25, the output terminal of gating circuit 21c is connected by means of electrical lead 24c to the third input terminal of decision circuit 25, the output terminal of gating circuit 21d is connected by means of electrical lead 24b to the fourth input terminal of decision circuit 25, and the output terminal of gating circuit 21e is connected by means of electrical lead 24e to the fifth input terminal of decision circuit 25.

One type of gating circuit that may be utilized for gating circuits 21a–21e is shown and described on page 604 of "Radio Engineering" by Frederick E. Terman, published in 1947 by the McGraw-Hill Book Co., Inc., New York. Decision circuit 25 is of the same type as decision circuit 17 except that, whereas decision circuit 17 preferably comprises only one flip-flop circuit of the type mentioned, decision circuit 25 comprises five such flip-flop circuits.

Finally, an output device 26 is electrically connected to the five output terminals of decision circuit 25. Output device 26 is merely a recorder for recording on five separate channels the signals produced at the five output terminals of decision circuit 25. A magnetic tape recorder that records information on a plurality of channels is a standard commercially available device that may be used as the output device.

Referring now to Fig. 2, there is shown a network, comprising a plurality of multivibrators, differentiating circuits and cathode follower circuits, that may be used as gating waveform generator 20 in the circuit of Fig. 1. More particularly, network 20 of Fig. 2 comprises five multivibrators 27, 28, 30, 31, 32 and four differentiating circuits 33, 34, 35, 36, the multivibrators and differentiating circuits being electrically connected in tandem in such a manner that a differentiating circuit is interposed between each successive pair of multivibrators. In other words, differentiating circuit 33 is electrically connected between multivibrators 27 and 28, differentiating circuit 34 is electrically connected between multivibrators 28 and 30, differentiating circuit 35 is electrically connected between multivibrators 30 and 31, and differentiating circuit 36 is electrically connected between multivibrators 31 and 32. The network of Fig. 2 also comprises five cathode follower circuits 37, 38, 40, 41, 42 electrically connected to the output terminals of multivibrators 27, 28, 30, 31, 32, respectively, as shown in the figure.

It should be noted that the input terminal of multivibrator 27, designated 43, is identical with the input terminal of gating waveform generator 20 in Fig. 1 and is, therefore, electrically connected to the output terminal of differentiating and detector circuit 18. Moreover, the output terminals of cathode follower circuits 37, 38, 40, 41, 42, designated 44, 45, 46, 47, 48, respectively, constitute the five output terminals of gating waveform generator 20 and, therefore, are electrically connected by means of electrical leads 23a–23e to the five second input terminals of gating circuits 21a–21e, respectively.

Figure 3:
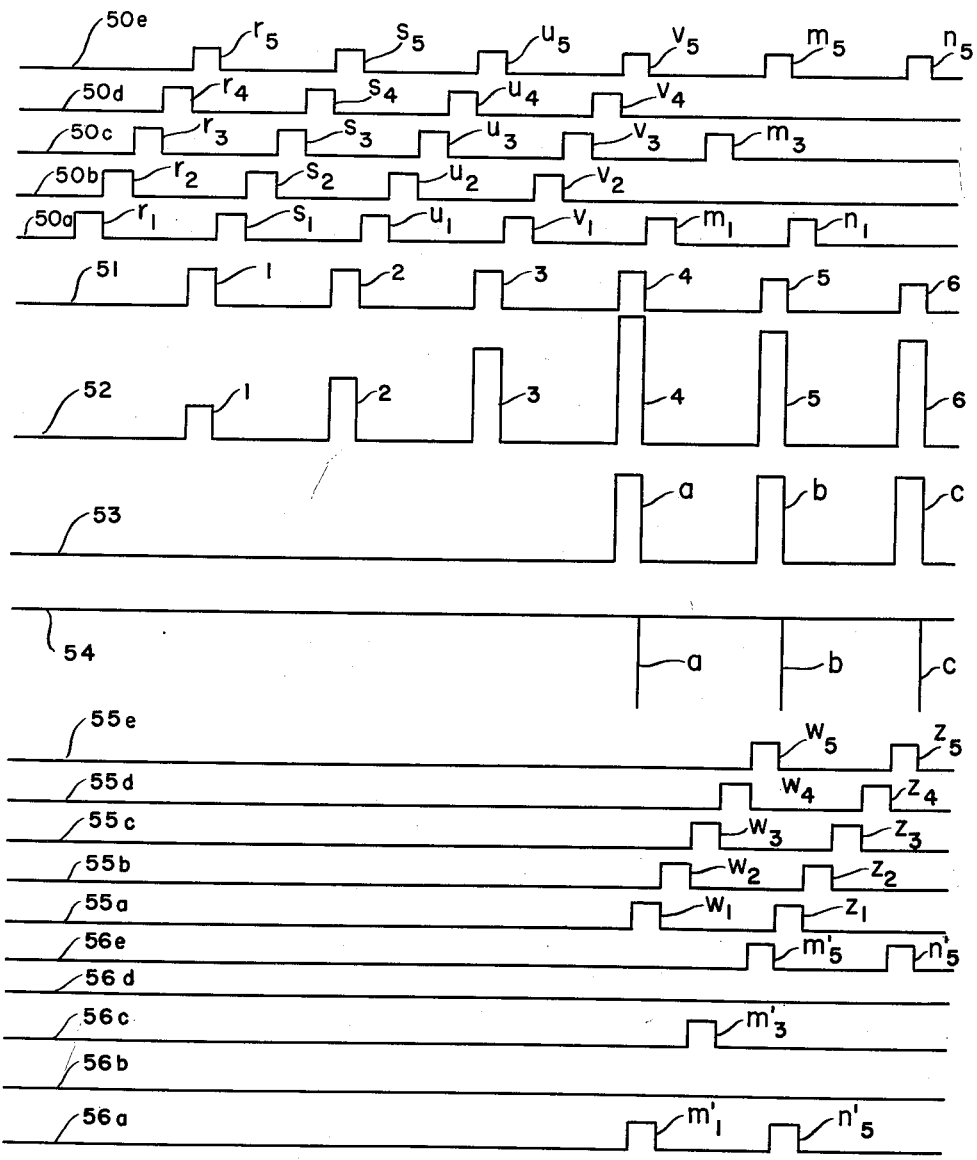
Fig. 3 is a composite diagram of waveforms representing signals produced at various points in the system of Fig. 1.

Considering now the operation, reference is made to Fig. 3 wherein there is shown the waveforms for five trains of pulses, designated 50a–50e, applied to the gating system of the present invention, the pulses of pulse trains 50a–50e being substantially of equal amplitude and duration. The time interval between pulses of any one of the pulse trains 50a–50e is equal to the time interval between corresponding pulses in any other of the pulse trains 50a–50e. The pulse period of pulse trains 50a–50e is equal to five times the duration of an individual pulse. Individual corresponding pulses of the pulse trains 50a–50e occupy five pulse positions immediately following each other in time. Pulse trains 50a–50e basically comprise two groups of pulses, a first group of pulses representing an initiating signal and a second group of pulses representing the received intelligence, the first group of pulses being prefixed to the second group to prevent any loss in recording the information, as will be more clearly understood later.

More specifically, the first group of pulses comprise at least four successive arrays of pulses, each array comprising five pulses occupying five pulse positions, respectively, immediately following each other in time. Thus, as shown in Fig. 3, pulses $r_1$ to $r_5$ of pulse trains 50a to 50e, respectively, from the first array, pulses $s_1$ to $s_5$ form the second array, pulses $u_1$ to $u_5$ form the third array, and pulses $v_1$ to $v_5$ form the fourth and last array.

The second group of pulses comprise as many arrays of pulses as are needed to complete the information. In this group, however, not all the pulse positions of an array are occupied by pulses. Instead, an array will usually comprise a permutation of pulses and spaces, the particular permutation of pulses and spaces representing a particular character of information. Thus, pulses $m_1$, $m_3$ and $m_5$ in Fig. 3 are an array representing one character of information and pulses $n_1$, $n_5$ are an array representing another character of information.

Referring now to both Figs. 1 and 3, pulse trains 50a–50e are applied to input terminals 10a–10e, respectively. Consequently, pulse trains 50a–50e are also applied to cathode follower circuits 11a–11e, respectively, which, in turn, apply the pulse trains to the input and output terminals of delay line sections 13a–13d. More particularly, pulse train 50a is applied to the input end of delay line section 13a, pulse train 50b is applied to the input end of delay line section 13b, pulse train 50c is applied to the input end of delay line section 13c, pulse train 50d is applied to the input end of delay line section 13d, and pulse train 50e is applied to the output end of delay line section 13d.

Each pulse train is delayed by the delay line section to which it is applied by an interval of time equal to the duration of a pulse and, as a result, at the output end of delay line section 13d, pulse trains 50a–50e are superimposed or aligned with each other so as to form a single or composite pulse train, as shown by waveform 51 in Fig. 3. In other words, pulses $r_1$ to $r_5$ of pulse trains 50a to 50e, respectively, are superimposed by delay line sections 13a to 13d to produce pulse 1 of pulse train 51 and, similarly, pulses $s_1$ to $s_5$ are superimposed to produce pulse 2 of pulse train 51 and so on, until pulses $n_1$, $n_5$ are superimposed to produce pulse 6 of pulse train 51. It will be seen from a comparison of pulse trains 50a to 50e and pulse train 51 that the pulse period of pulse train 51 is the same as the pulse period of each of the pulse trains 50a–50e, that is, the pulses of pulse train 51 are separated from each other by an interval of time equal to five times the duration of an individual pulse.

Pulse train 51 is applied to delay line sections 14a–14c, the pulses of pulse train 51 being successively delayed by the delay line sections for the intervals of time previously ascribed to them so that, ultimately, four pulses, that is, an original pulse and three delayed images of successive preceding pulses, are simultaneously produced at their input and output terminals at regular intervals of time, as is explained below. More specifically, pulse 1 of pulse train 51 is applied to delay line section 14a and, at the same time, pulse 1 is also applied via electrical lead 16a to the first input terminal of adder circuit 15. The adder circuit, in turn, applies pulse 1 to decision circuit 17. Following this, pulse 1 of pulse train 51 is delayed by delay line section 14a, as previously mentioned, so that, at the end of the delay period, a first delayed image of pulse 1 is produced at the output end of delay line section 14a at the same time that pulse 2 of pulse train 51 is applied to the input end of delay line section 14a. Consequently, the first delayed image of pulse 1 is applied via electrical lead 16b to the second input terminal of adder circuit 15 and, simultaneously, pulse 2 of pulse train 51 is applied via electrical lead 16a to the first input terminal of adder circuit 15, which adds pulses 1 and 2 to produce a pulse whose amplitude corresponds to the sum of the amplitudes of pulses 1 and 2. This pulse is also applied to decision circuit 17.

It can thus be seen that eventually pulses 1, 2 and 3 as well as pulses 1, 2, 3 and 4 of pulse train 51 will simultaneously be produced at the input and output ends of delay line sections 14a–14c and, therefore, simultaneously applied to adder 15. It will be equally obvious that pulses 2, 3, 4 and 5 as well as pulses 3, 4, 5 and 6 of pulse train 51 will eventually also be simultaneously applied to adder circuit 15. It will further be obvious to those skilled in the art that in response to each of the above-mentioned groups of simultaneously applied pulses, adder circuit 15 applies a combined pulse to decision circuit 17, the amplitude of this combined pulse corresponding to the sum of the amplitudes of the pulses in the associated group of pulses.

Thus, a sequence of pulses of varying amplitude, as shown by waveform 52 in Fig. 3, are applied to decision circuit 17. More particularly, pulse 1 of pulse train 52, as applied to decision circuit 17, corresponds in amplitude to the amplitude of pulse 1 of pulse train 51; pulse 2 of pulse train 52, as applied to decision circuit 17, corresponds in amplitude to the sum of the amplitudes of pulses 1 and 2 of pulse train 51; pulse 3 of pulse train 52 corresponds in amplitude to the sum of the amplitudes of pulses 1, 2 and 3 of pulse train 51; pulse 4 of pulse train 52 corresponds in amplitude to the sum of the amplitudes of pulses 1, 2, 3 and 4 of pulse train 51; pulse 5 of pulse train 52 corresponds in amplitude to the sum of the amplitudes of pulses 2, 3, 4 and 5 of pulse train 51; and pulse 6 of pulse train 52 corresponds in amplitude to the sum of the amplitudes of pulses 3, 4, 5 and 6 of pulse train 51.

As previously mentioned, decision circuit 17 is a threshold type of device that produces an output pulse only when the signal applied thereto exceeds a predetermined voltage level. In the circuit of the present invention, the threshold voltage of decision circuit 17 has arbitrarily been set at the amplitude of pulse 3 of pulse train 52. Thus, when pulse train 52 is applied to decision circuit 17, the decision circuit will produce output pulses only in response to pulses 4, 5 and 6 of pulse train 52 since it is only pulses 4, 5 and 6 in Fig. 3 that exceed the threshold voltage level, namely, the amplitude of pulse 3. The pulse train produced by decision circuit 17 in response to pulse train 52 is shown as waveform 53 in Fig. 3 and the pulses of pulse train 53 produced in response to pulses 4, 5 and 6 of pulse train 52, which may be referred to as synchronizing pulses, are designated $a$, $b$, $c$, respectively.

It should be noted that the build up in amplitude of the pulses of pulse train 52 and the pulses of pulse train 53 produced in response thereto by decision circuit 17 are ultimately the result of all the pulses of pulse trains $50a$–$50e$ in a given interval of time, with each pulse contributing to the result. Therefore, the presence or absence of any one pulse in pulse trains $50a$–$50e$ does not materially affect the pulse summation. Consequently, the threshold voltage of decision circuit 17 may be set so that the arrays of pulses in the second group of pulses representing the information will cause decision circuit 17 to continuously produce output pulses in the manner previously described.

Pulse train 53 is applied to differentiating and integrating circuit 18 which, in response thereto, produces a train of voltage spikes or pips, as shown by waveform 54 in Fig. 3, the pips being designated $a$, $b$ and $c$ to correspond with pulses $a$, $b$ and $c$, respectively, of pulse train 53. More particularly, the differentiating portion of circuit 18 differentiates the pulses of pulse train 53 and, as a result, positive and negative voltage pips are produced, the positive pips coinciding with the leading edges of pulses $a$, $b$ and $c$ of pulse train 53 and the negative pips coinciding with the lagging edges of pulses $a$, $b$ and $c$. The detector portion of circuit 18 passes only the negative pips to its output terminal, as shown by waveform 54.

Pulse train 54 is applied to gating waveform generator 20 and, in response thereto, the waveform generator produces five trains of pulses, as shown by waveforms $55a$–$55e$ in Fig. 3, one such pulse train at each of the five generator output terminals. Stated differently, in response to each of voltage pips $a$, $b$ and $c$, waveform generator produces an array of five pulses during the interval of time between pips, as shown by pulses $w_1$ to $w_5$ of pulse trains $55a$ to $55e$, respectively. By comparing pulse trains $55a$–$55e$ with pulse trains $50a$–$50e$, it will be seen that the pulses in the arrays of pulse trains $50a$–$50e$ coincide in time with the corresponding pulses in the corresponding arrays of pulse trains $55a$–$55e$. Thus, for example, pulses $m_1$, $m_3$ and $m_5$ of pulse trains $50a$–$50e$ coincide in time with pulses $w_1$, $w_3$ and $w_5$ of pulse trains $55a$–$55e$, respectively.

A better understanding of how pulse trains $55a$–$55e$ are generated may be obtained by referring to gating waveform generator 20 in Fig. 2. Thus, when voltage pip "$a$" of pulse train 54 is applied to input terminal 43, multivibrator 27, in response to the pip, produces a rectangular pulse which is applied through cathode follower 37 to output terminal 44. This rectangular pulse at output terminal 44 corresponds to pulse $w_1$ of pulse train $55a$. The rectangular pulse produced by multivibrator 27 is also applied to differentiating circuit 33 which differentiates the pulse to produce positive and negative pips therefrom. The negative pip is then used to trigger multivibrator 28 which produces another rectangular pulse. This latter rectangular pulse appears at output terminal 45 and corresponds to pulse $w_2$ of pulse train $55b$. The rectangular pulse produced by multivibrator 28 is also differentiated and the negative pip resulting therefrom is used to trigger multivibrator 30.

If the operation explained above is followed through for the rest of generator 20, it will be seen that multivibrator 30 produces a rectangular pulse at output terminal 46 that corresponds to pulse $w_3$ of pulse train $55c$, multivibrator 31 produces a rectangular pulse at output terminal 47 that corresponds to pulse $w_4$ of pulse train $55d$, and multivibrator 32 produces a rectangular pulse at output terminal 48 that corresponds to pulse $w_5$ of pulse train $55e$. Similarly, voltage pip "$b$" of pulse train 54 will cause a second array of pulses to be produced at the five output terminals of gating waveform generator 20, as indicated by pulses $z_1$ to $z_5$ in Fig. 3, and subsequent pips will instigate subsequent pulse arrays.

Pulse trains $55a$–$55e$ are applied via electrical leads $23a$–$23e$ to the second input terminals of gating circuits $21a$–$21e$, respectively, and, as a result, the gating circuits are successively gated "on." Any signals applied to the first input terminals of gating circuits $21a$–$21e$ while they are thus gated "on" are passed to the output terminals of the gating circuits and, therefore, applied to decision circuit 25.

More specifically, pulses $w_1$ and $z_1$ of pulse train $55a$ will successively gate "on" gating circuit $21a$, pulses $w_2$ and $z_2$ of pulse train $55b$ will successively gate "on" gating circuit $21b$, pulses $w_3$ and $z_3$ of pulse train $55c$ will successively gate "on" gating circuit $21c$, pulses $w_4$ and $z_4$ of pulse train $55d$ will successively gate "on" gating circuit $21d$, and pulses $w_5$ and $z_5$ of pulse train $55e$ will successively gate "on" gating circuit $21e$. Since pulse arrays $w_1$ to $w_5$ and $z_1$ to $z_5$ of pulse trains $55a$–$55e$ coincide in time with the pulse arrays of pulse trains $50a$–$50e$, any pulse array applied to the first input terminals of gating circuits $21a$–$21e$ will be passed, via electrical leads $24a$–$24e$, to decision circuit 25. Thus, by way of example, pulses $m_1$, $m_3$ and $m_5$ of pulse trains $50a$, $50c$ and $50e$, respectively, coincide in time with pulses $w_1$, $w_3$ and $w_5$ of pulse trains $55a$, $55c$ and $55e$, respectively, and, therefore, when pulses $m_1$, $m_3$ and $m_5$ are applied to gating circuits $21a$, $21c$ and $21e$, they will be applied via leads $24a$, $24c$ and $24e$ to decision circuit 25.

The arrays of pulses applied to decision circuit 25, such as pulses $m_1$, $m_3$ and $m_5$ referred to above, exceed the threshold voltage levels of the threshold devices constituting the decision circuit and, as a result, cause the decision circuit to produce corresponding pulses, as indicated by waveforms $56a$–$56e$ in Fig. 3. In other words, in response to pulses $m_1$, $m_3$ and $m_5$ and pulses $n_1$ and $n_5$, decision circuit 25 produces pulses $m_1'$, $m_3'$ and $m_5'$ and pulses $n_1'$ and $n_5'$. These latter arrays of pulses, representing characters of information, are applied to output device 26 where they are recorded. Thus, the gating system of the present invention permits received signals to be passed and recorded only when information pulses are expected to occur.

Having thus described the invention, what is claimed as new is:

1. A gating system for passing to a recording device received trains of pulses that contain desired coded information only during time intervals when pulses may be present, the pulses being substantially of equal amplitude and duration and the time interval between pulses of any one train of pulses being equal to the time interval between corresponding pulses in any other train of pulses, said system comprising: alignment means for superimposing corresponding pulses of the received trains of pulses to produce a single train of pulses, the amplitude of each pulse in said single train of pulses being proportional to the number of corresponding pulses in the associated group of superimposed pulses; means electrically connected to said alignment means for successively combining groups of pulses of said single train of pulses to produce another train of pulses, the amplitude of each pulse in said other train of pulses being proportional to the sum of the amplitudes of the pulses in the associated group of combined pulses; threshold means biased to a predetermined voltage level, said threshold means being electrically connected to said means and responsive to each pulse of said other train of pulses whose amplitude exceeds said predetermined voltage level to produce an output pulse, thereby producing an additional train of pulses of equal amplitude and duration; a differentiating and detector circuit electrically connected to said threshold means for producing, in response to said additional train of pulses, a train of unidirectional voltage spikes; a gating waveform generator electrically connected to said differentiating and detector circuit and responsive to said train of voltage spikes for producing a plurality of trains of pulses equal in number to and synchronized in time with the received trains of pulses; and a plurality of gating circuits electrically connected to said gating waveform generator, one gating circuit for each train of pulses produced by said gating waveform generator, said plurality of gating circuits normally being gated "off" and being gated "on" in response to said plurality of trains of pulses to pass the received trains of pulses to the recording device.

2. A gating system for passing to a recording device only the pulses of $n$ received trains of pulses, the pulses being substantially of equal amplitude and duration and the time interval between pulses of any one train of pulses being equal to the time interval between corresponding pulses in any other train of pulses, said system comprising: $n$ input terminals for receiving the $n$ trains of pulses, respectively; $n-1$ delay line sections electrically connected between said $n$ input terminals, one delay line section being connected between each pair of adjacent input terminals, said delay line sections delaying the $n$ received trains of pulses by predetermined intervals of time such that corresponding pulses of the $n$ trains of pulses are superimposed to produce a single train of pulses of varying amplitude, the amplitude of each pulse in said single train of pulses being proportional to the number of corresponding pulses in the associated group of superimposed pulses; an adder circuit having $m$ input terminals, where $m$ is an integer less than $n$, said adder circuit being operable to produce an output pulse in response to each group of $m$ pulses simultaneously applied to said $m$ input terminals, respectively, the amplitude of each output pulse corresponding to the sum of the amplitudes of the $m$ pulses simultaneously applied to said $m$ input terminals; $m-1$ delay line sections electrically connected to said $n-1$ delay line sections and electrically connected between the $m$ input terminals of said adder circuit, one delay line section being connected between each pair of adjacent input terminals, said $m-1$ delay line sections delaying said single train of pulses in such a manner that successive groups of $m$ pulses are simultaneously applied to the $m$ input terminals of said adder circuit, whereby said adder circuit produces an output train of pulses of varying amplitude; a decision circuit biased to a predetermined voltage level, said decision circuit being electrically connected to said adder circuit for producing an additional output pulse in response to each output pulse of said output train of pulses whose amplitude exceeds said predetermined voltage level, thereby to produce an additional train of output pulses; a differentiating and detector circuit electrically connected to said decision circuit for producing, in response to said additional train of output pulses, a train of unidirectional voltage spikes; a gating waveform generator having $n$ output terminals, said generator being electrically connected to said differentiating and detector circuit and responsive to said train of voltage spikes for producing $n$ trains of pulses synchronized in time with the $n$ received trains of pulses, one train of pulses being produced at each of the $n$ output terminals; and $n$ gating circuits electrically connected to said $n$ input terminals and to the $n$ output terminals of said generator, respectively, said $n$ gating circuits normally being gated "off" and being gated "on" in response to said $n$ trains of pulses produced by said generator to pass the $n$ received trains of pulses to the recording device.

3. A gating system for passing $n$ received trains of pulses only when pulses are expected to occur in order to discriminate against noise during intervals when pulses are not expected to occur, said pulses being substantially of equal amplitude and duration and the time interval between pulses of any one received train of pulses being equal to the time interval between corresponding pulses in any other received train of pulses, said system comprising: $n$ input terminals for receiving the $n$ trains of pulses, respectively; $n$ cathode follower circuits electrically connected to said $n$ input terminals, respectively; $n-1$ delay line sections electrically connected in tandem between said $n$ cathode follower circuits, one delay line section being connected between each pair of adjacent cathode follower circuits, said delay line sections delaying the $n$ received trains of pulses by predetermined intervals of time such that corresponding pulses of the $n$ received trains of pulses are superimposed to produce a single train of pulses, the amplitude of each pulse in said single train of pulses being proportional to the number of corresponding pulses in the associated group of superimposed pulses; means electrically connected to the $(n-1)$th section of said $n-1$ delay line sections for successively combining groups of pulses of said single train of pulses to produce another train of pulses, the amplitude of each pulse in said other train of pulses corresponding to the sum of the amplitudes of the pulses in the associated group of combined pulses; a decision circuit biased to a predetermined voltage level, said decision circuit being electrically connected to said means and responsive to each pulse of said other train of pulses whose amplitude exceeds said predetermined voltage level to produce a synchronizing pulse, thereby to produce an additional train of output pulses; a gating waveform generator having $n$ output terminals, said generator being electrically connected to said decision circuit and responsive to said train of synchronizing pulses to produce $n$ trains of pulses synchronized in time with the $n$ received trains of pulses, respectively, one train of pulses being produced at each of the $n$ output terminals; and $n$ gating circuits electrically connected to said $n$ input terminals and to said $n$ output terminals, respectively, said $n$ gating circuits normally being inoperable and being rendered operable in response to said $n$ trains of pulses produced by said generator to pass the $n$ received trains of pulses to the recording device.

4. The gating system defined in claim 3 wherein said means includes a plurality of delay line sections electrically connected in tandem to the $(n-1)$th section of said $n-1$ delay line sections, said plurality of delay line sections delaying the pulses of said single train of pulses by predetermined intervals of time such that a plurality of said pulses are simultaneously produced at intervals; and an adder circuit electrically connected to said plurality of delay line sections, said adder circuit adding the amplitudes of each plurality of simultaneously produced pulses to produce a corresponding pulse whose amplitude is proportional to the sum of the amplitudes of the associated plurality of simultaneously produced pulses.

5. A gating system for individually and periodically passing a plurality of received pulse trains only when pulses may be present in order to reject noise in intervals between pulses, said received pulse trains having pulses of an equal amplitude and duration and having equal repetition periods, the repetition period of each of said trains being equal to the sum of the time durations of corresponding pulses in each of said trains, corresponding pulses of each of said trains being staggered in time of occurrence to occur at different times to form pulse arrays, intelligence being conveyed by the presence or absence of pulses in said pulse arrays in accordance with a predetermined code, said gating system comprising: pulse delaying means responsive to said pulse trains for causing corresponding pulses of said trains to be in time coincidence, the amplitudes of the coincident ones of said pulses combining additively to develop a train of composite pulses, a plurality of composite pulses delaying means coupled to said pulse delaying means for delaying each of said composite pulses to form a number of successive delayed images of each of said composite pulses, pulse combining means coupled to said composite pulse delaying means for combining the amplitudes of coincident ones of said composite pulses and delayed images of said composite pulses to develop a train of combined pulses having a period equal to the period of said received pulse trains, an amplitude responsive circuit coupled to said combining means for passing those of said combined pulses which exceed a predetermined amplitude, a plurality of gate circuits individually responsive to said received pulse trains, and a gating pulse generator coupled to said amplitude responsive circuit for developing gating pulses synchronized with those of said combined pulses which are passed by said amplitude responsive circuit, said gating pulse generator being coupled to said plurality of gate circuits, whereby said gating pulses permit said plurality of gate circuits to individually pass said plurality of received pulse trains only when pulses may be present, thereby discriminating against noise in intervals between pulses of said received pulse trains.

6. A gating system responsive to a plurality of trains of pulses, corresponding pulses of said trains being staggered to occur at different times to form successive arrays of pulses, the absence of selected ones of said pulses from said trains conveying information according to a predetermined code, said gating system comprising: first time delaying means responsive to said trains of pulses for coincidentally combining the amplitudes of all pulses of each array to develop individual composite pulses for each array having amplitudes which are the sum of the amplitudes of the individual pulses of the corresponding array of pulses, second time delaying means coupled to said first named means and responsive to said composite pulses for coincidentally combining the amplitude of each composite pulse with the amplitudes of a plurality of delayed images of preceding composite pulses to develop combined pulses having amplitudes which are the sum of the amplitudes of a plurality of successive arrays of pulses, amplitude responsive means coupled to said second named means and responsive to said combined pulses for passing only pulses which exceed a predetermined amplitude to develop synchronizing pulses, pulse forming means coupled to said amplitude responsive means for developing gating pulses synchronized with said synchronizing pulses, and gating means coupled to said pulse forming means for passing said plurality of trains of pulses only when pulses may occur.

7. A gating system comprising: first pulse combining means responsive to signals on $n$ individual channels for individually delaying signals on all but one of said channels by different intervals, all of the intervals being integral multiples of the shortest interval, and combining the amplitudes of the delayed signals with the amplitude of the undelayed signal to develop a composite signal, second pulse combining means coupled to said first pulse combining means for delaying said composite signal by a plurality of successive equal intervals to develop a plurality of delayed images of said composite signal, each interval being $n$ times said shortest interval, said second combining means combining the amplitude of said composite signal with the amplitudes of the delayed images of said composite signal after each of said successive delay intervals to develop a combined signal, amplitude responsive means coupled to said second pulse combining means for passing said combined signal when it exceeds a predetermined amplitude to develop synchronizing pulses, pulse forming means coupled to said amplitude responsive means for developing gating pulses synchronized with said synchronizing pulses, and gating means coupled to said pulse forming means for individually passing signals on said individual channels only during the occurrence of said gating pulses.

References Cited in the file of this patent

UNITED STATES PATENTS

| | | |
|---|---|---|
| 2,211,942 | White | Aug. 20, 1940 |
| 2,227,052 | White | Dec. 31, 1940 |
| 2,549,422 | Carbrey | Apr. 17, 1951 |
| 2,752,507 | Dureau | June 26, 1956 |
| 2,807,715 | Lesti | Sept. 24, 1957 |